(12) United States Patent
de Luna

(10) Patent No.: US 9,916,434 B2
(45) Date of Patent: Mar. 13, 2018

(54) OFFICE INFRASTRUCTURE DEVICE WITH EXTENDED INTEGRATED BIOMETRIC LOGIN SYSTEM

(71) Applicant: Renato M. de Luna, Bolton, MA (US)

(72) Inventor: Renato M. de Luna, Bolton, MA (US)

( * ) Notice: Subject to any disclaimer, the term of this patent is extended or adjusted under 35 U.S.C. 154(b) by 10 days.

(21) Appl. No.: 15/200,497

(22) Filed: Jul. 1, 2016

(65) Prior Publication Data

US 2016/0314291 A1    Oct. 27, 2016

Related U.S. Application Data

(63) Continuation-in-part of application No. 14/633,283, filed on Feb. 27, 2015.

(51) Int. Cl.

| | |
|---|---|
| *H04L 12/24* | (2006.01) |
| *H04L 29/08* | (2006.01) |
| *G06F 21/32* | (2013.01) |
| *G06F 21/34* | (2013.01) |
| *G06F 9/44* | (2018.01) |
| *H04L 29/06* | (2006.01) |
| *G06F 9/445* | (2018.01) |

(52) U.S. Cl.
CPC ............ *G06F 21/32* (2013.01); *G06F 9/4413* (2013.01); *G06F 9/4445* (2013.01); *G06F 9/44584* (2013.01); *G06F 21/34* (2013.01); *H04L 63/0861* (2013.01); *G06F 9/4451* (2013.01); *H04L 67/02* (2013.01); *H04L 67/1097* (2013.01)

(58) Field of Classification Search
CPC ............... H04L 63/0861; G06F 9/4445; G06F 9/44584; G06F 21/32

USPC .......................... 709/212, 218, 219, 220, 245
See application file for complete search history.

(56) References Cited

U.S. PATENT DOCUMENTS

| | | |
|---|---|---|
| 4,353,056 A | 10/1982 | Tsikos |
| 5,973,623 A | 10/1999 | Gupta et al. |
| 6,088,585 A | 7/2000 | Schmitt et al. |
| 6,325,285 B1 | 12/2001 | Baratelli |
| 6,512,381 B2 | 1/2003 | Kramer |
| 6,720,712 B2 | 4/2004 | Scott et al. |

(Continued)

OTHER PUBLICATIONS

"Hack Attack: Quick Launch Your USB Workspace"—Stack Adam Pash, Lifehacker.com, Jun. 2006 https://lifehacker.com/182792/hack-attack-quicklaunch-your-usb-workspace.*

(Continued)

*Primary Examiner* — Randy Scott

(57) ABSTRACT

A mission-specific computer peripheral, incorporating an integrated biometric login system, provides a portable linkable work platform. The device is used for establishing a shareable office computing infrastructure on a host personal computer and for accessing securely thereon (i.e., through biometric identification) a comparatively extensive selection of applications, services, and functions. In its principal embodiment, the device includes data storage (used for reading and writing both system and user data), user executable code (for launching the shareable office computing infrastructure on the host personal computer), and a power button containing an integrated fingerprint scanner (used to capture biometric data for authentication together with a unique device identification code). Incorporation of the biometric login system into the device promotes its accessibility and convenience.

7 Claims, 11 Drawing Sheets

(56) References Cited

U.S. PATENT DOCUMENTS

| | | | |
|---|---|---|---|
| 7,111,060 | B2 | 9/2006 | Araujo et al. |
| 7,593,782 | B2 | 9/2009 | Jobs et al. |
| 7,613,446 | B2 | 11/2009 | Engstrom et al. |
| 7,797,633 | B2 | 9/2010 | Flick |
| 7,809,882 | B1 | 10/2010 | Patterson et al. |
| 8,311,514 | B2 | 11/2012 | Bandyopadhyay et al. |
| 8,407,773 | B1 * | 3/2013 | Hayter .................... H04L 67/16 726/7 |
| 9,250,660 | B2 | 2/2016 | Ballard et al. |
| 2002/0083329 | A1 | 6/2002 | Kiyomoto |
| 2005/0210271 | A1 * | 9/2005 | Chou ....................... G06F 21/32 713/186 |
| 2008/0046442 | A1 | 2/2008 | Grason et al. |
| 2011/0298711 | A1 | 12/2011 | Dean et al. |
| 2012/0042216 | A1 | 2/2012 | Blubaugh |
| 2012/0166685 | A1 | 6/2012 | Booth et al. |
| 2012/0182253 | A1 | 7/2012 | Brosnan |
| 2014/0067995 | A1 | 3/2014 | Schachtel et al. |
| 2014/0164870 | A1 | 6/2014 | Sun et al. |

OTHER PUBLICATIONS

International Search Report and Written Opinion, received in PCT/US16/19488 (dated Jun. 9, 2016).
Office Action (Notification Date Oct. 14, 2016), received in co-pending parent U.S. Appl. No. 14/633,283.
Int'l App. PCT/US14/32418, Oct. 9, 2014, Sadry.
Diagnostic Menu, Motorola Suriboard Cable Modem Model No. SB6121 (Motorola 2013).
eJournal USA, "Entreprenuership and Small Buiness", US Department of State (Jan. 2006).
Leonhardt, "Consultant Nation", New York Times (Dec. 10, 2011).
Western Digital Technologies, "WD My Cloud: Personal Cloud Storage: User Manual", Document No. 4779-705103-A01 (Nov. 2013).
Matt Brian, "Why Apple Really Bought Authentec", The Next Web (Aug. 16, 2012), available at <<http://tnw.to/n2wN>>.

* cited by examiner

OFFICE INFRASTRUCTURE DEVICE WITH EXTENDED INTEGRATED BIOMETRIC LOGIN SYSTEM

The present application is a continuation-in-part of pending U.S. patent application Ser. No. 14/633,283, filed Feb. 27, 2015.

FIELD

The present invention relates in general to electronic data sharing and collaboration, and more particularly, to an office infrastructure virtualization device with an integrated biometric detection system having extended login capability.

BACKGROUND

Peripheral data storage devices engineered to offer individuals the ability to quickly establish private collaborative work group are of current interest.

In particular, in U.S. patent application Ser. No. 14/633,283, filed Feb. 27, 2015, there is disclosed a "mission-specific" computer peripheral that provides a portable linkable work platform, which is stated to be useful for "establishing an office computing infrastructure quickly, at low cost, and without professional computing expertise".

The office infrastructure device includes both data storage (for storage of operating and user data) and a unique device identification code (for identification when the device is plugged into a host personal computer). When connected, user executable code within the device is accessed through the host personal computer to launch thereon a user-definable work space. This work space provides, among other office infrastructure functions and applications, access to programming that enables the "synching" of data between the device and a private internet site, as well as programming that enables the user to manage and share data with other authorized office infrastructure device users.

In the course of developing and improving this technology, it was observed that the novel platform provided broad opportunities for consolidating potentially several and disparate user applications. Even in basic embodiments, within a single work space window, a user is provided access to an integrated file sharing application, an integrated calendar application, and an integrated social network application. Addition by the user is anticipated.

With broad expansibility and evolving multi-functionality, the office infrastructure device can engender progressively heavier (and potentially knottier) usage over time. Development opportunities are thus felt available to make the device even more compelling and worthwhile throughout its course by streamlining its user authentication processes, and extending the resulting data to other integrated applications—original or later added—that are in need of it.

SUMMARY

In light of the stated opportunities, an office infrastructure with an integrated and extended biometric login system is presented.

The system is "integrated" in the sense that the device's biometric sensor is integrated into its activation mechanism (e.g., a fingerprint scanner embedded into the device's power button).

The system is "extended" in the sense that captured biometric data is utilized for unlocking a broad definable selection of services and functionalities available though or associated with a user's office infrastructure device or its shareable work spaces, such as private internet sites and hosts, personal online accounts and web services, and secured confidential data files and transmissions.

The incorporation of an integrated extended biometric login system improves substantially the functionality and convenience of the office infrastructure device. Reliance on cumbersome password based security systems, is reduced. And the comparatively more rigorous, yet less burdensome, authentication and identification processes are engineered for application at other intrinsic and extrinsic login gates, making more fluid user navigation within and through the device's work space.

The office infrastructure device comprises, in general, a user-accessible data storage accessible through a user-definable work space; a unique device identification code; a biometric login system capable of sensing a preselected biometric indicia of a user for computation of biometric identification data; and user-executable code scripted to launch said user-definable work space on said host personal computer, wherein the user-definable work space provides access to both said user-accessible data storage and a private internet site for hosting data from said data storage, and wherein said access is provided as a function of both said unique device identification code and said user biometric identification data.

It is a key object of the invention to provide an extended biometric login system in a mission-specific peripheral device capable of serving as a portable linkable work platform.

It is another key object of the invention to provide a "password free" work space, particularly executed from an office infrastructure device.

It is another objective to provide an office infrastructure device with a fingerprint sensor integrated into said device's power button.

It is another objective to integrate a fingerprint sensor into a device's activation means (such as a power button on an office infrastructure device), wherein the sensor reads a user's fingerprint in the course of device activation, the resulting fingerprint data being used, alone or in combination with other identification mechanisms, to provide exclusive access, beyond mere device activation, into some or all of the device's deeper enabled services and functionalities.

It is another objective of the invention to provide an office infrastructure device that, aside from its shareable work space, is used for user identification, to enable or substantially promote "password-free" access into certain extrinsic pre-established private or personal internet accounts and services.

For a further understanding of the nature and objects of the invention, reference should be had to the following description taken in conjunction with the accompanying drawings.

DETAILED DESCRIPTION

The mission-specific computer peripheral of the present invention provides a portable linkable work platform useful for establishing an office computing infrastructure quickly, at low cost, and without professional computing expertise.

The office infrastructure device includes data storage (which is used for storage and retrieval of operating data and user data) and the combination of a biometric login system and a unique device identification code (used together for identification when the device is plugged into a host personal computer).

When connected to a host computer, user executable code within the device can be executed through the host to launch thereon a user-definable work space. The work space provides (among other office infrastructure functions and applications) access to programming that enables the "synching" of data between the device and a private internet site, as well as programming that enables the user to manage and share data with other authorized office infrastructure device users. Members of the resultant shared network, through work space applications, can communicate amongst themselves, share individual and group work files, and coordinate activities, meetings, and events.

When disconnected, the user leaves the network and the local computer essentially reverts back to its original (or otherwise "pre-connection") state. Preferably, unless intentionally saved to the local computer or synced to the private internet site, the user's personal files and data are retained only on the office infrastructure device.

The device is engineered for modularity and can thus be initiated and scaled over time in cost effective graduated steps, e.g., tracking a user's business growth and development.

When first initiated, the device (connected to a host personal computer) presents to the user a "welcome screen" providing the options of either creating a new private work group or joining an existing one. See e.g., FIG. 3A, wherein both "create" and "join" options are made available through the "Create New" menu selection 312 in work space 310 executed on host personal computer 200 by office infrastructure device 10.

Selecting the option to create a private work group leads to further enrollment and registration processes, including the elicitation of "business profile data", which when supplied is stored in memory and used for subsequent device operation.

Figure 3A:
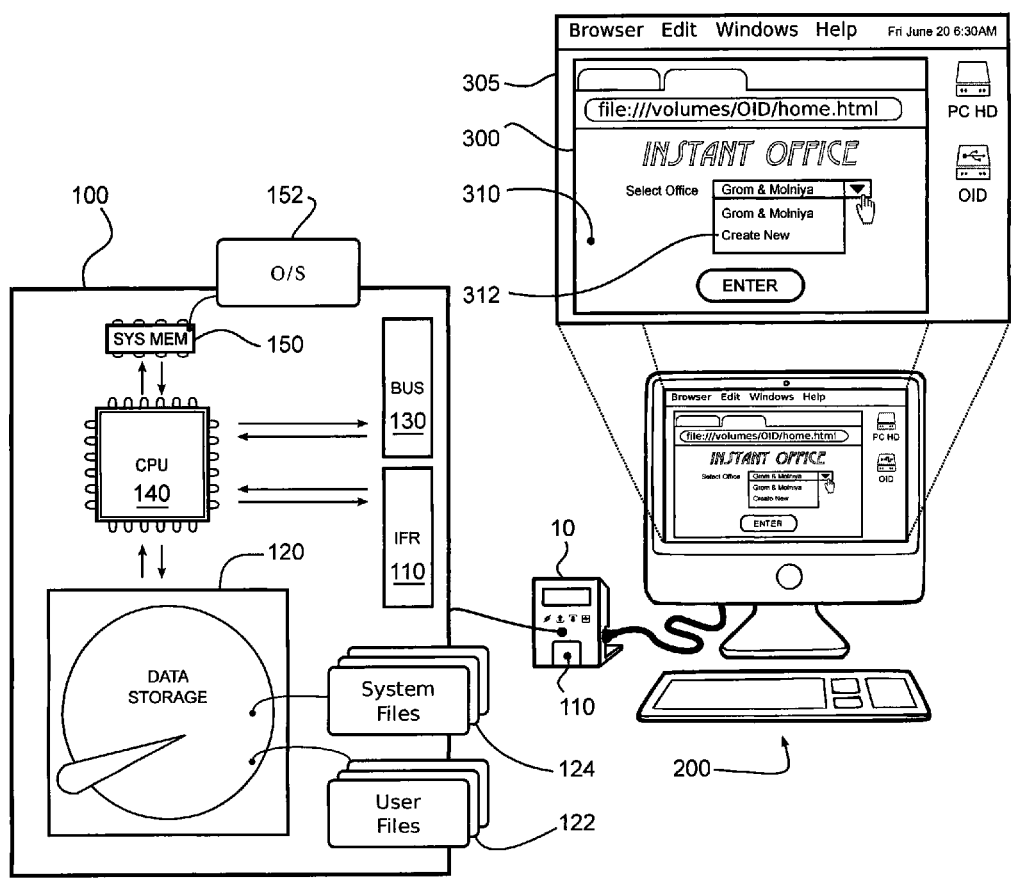
FIGS. 3A to 3C illustrate an office infrastructure device 10, according to an embodiment of the invention, performing certain of its operations in the course of navigating and accessing work space 310.
Figure 3B:
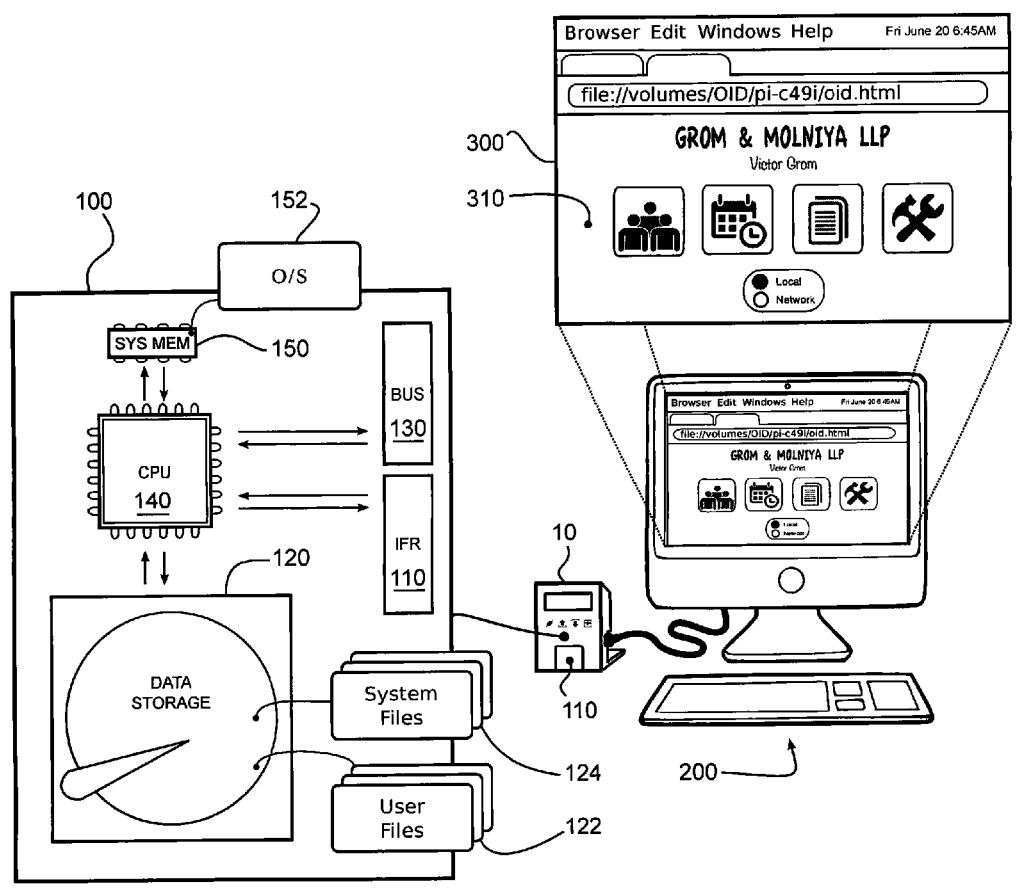
Figure 3C:
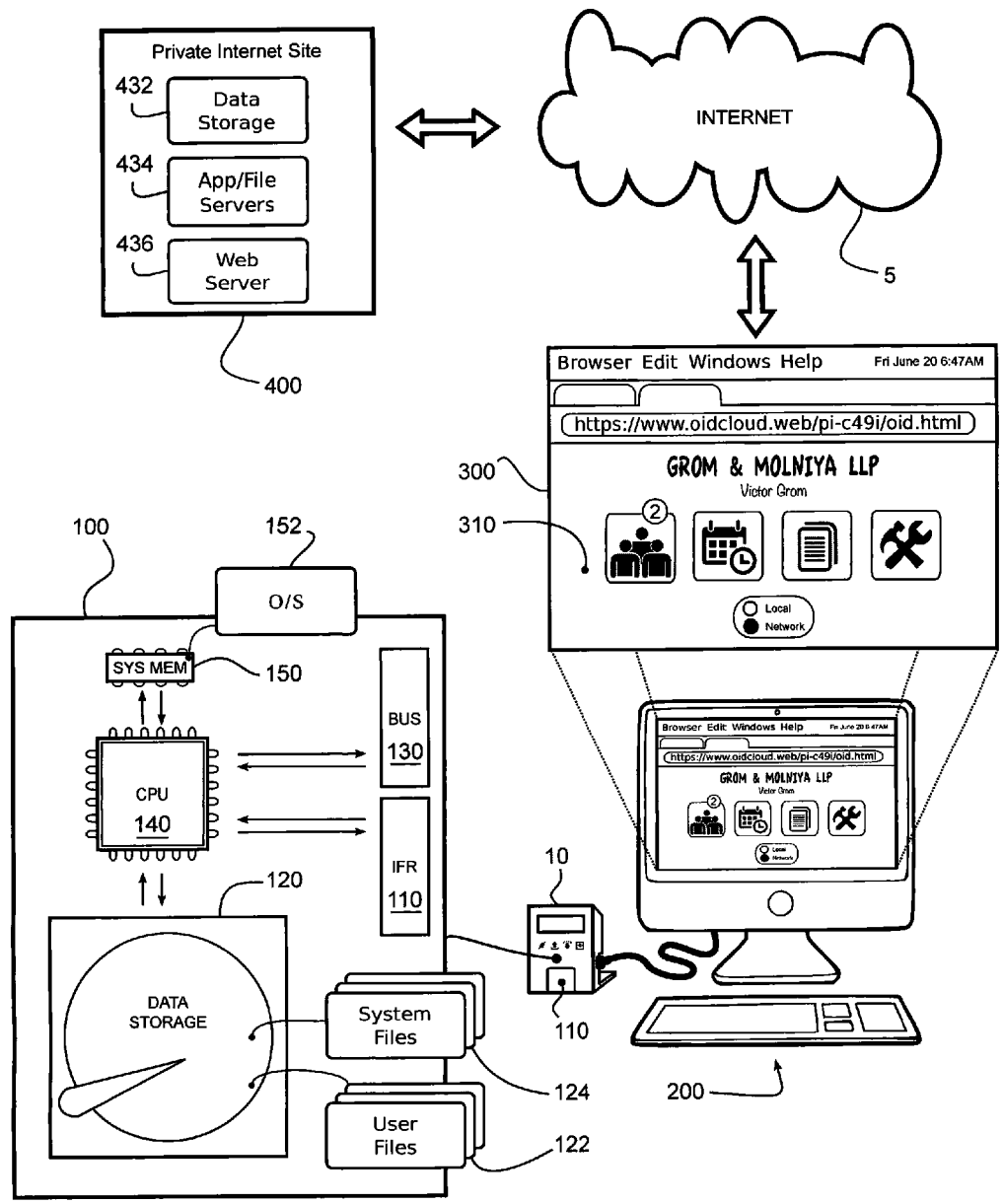

Once initiated, on subsequent connections, the welcome screen provides the option of accessing the newly initiated private work group (see e.g., work space 310 in FIG. 3A), and once therein, working in a "local" mode or a "connected" mode (see e.g., work space 310 in FIGS. 3B and 3C).

In the "local" mode, the user can keep the private work group locally isolated, retaining local functionality of the work space and any installed work space applications, whilst disabling or restricting access to local files and data by other authorized members of a private work group (if any). The "local" mode is preferably configured to retain connection or access to the private internet site to the extent advantageous for preserving critical or significant local functions, for example, so as not to prevent the user from mirroring, synching, backing up, or cataloguing the data files stored in the device.

In the "connected mode", more substantial, if not comprehensive, access to the private internet site and its functions is provided. File sharing and collaborative activities among the authorized members of a user's private work group (if any) are also enabled.

The expansion of a private work group by addition of new members is accomplished, for example, using the aforementioned "join" option. Provided with her own office infrastructure device, a new member selecting that option, if not previously enrolled, is lead to further device initiation and registration processes driven by the private internet site that, among other steps, collects the new member's profile information and acts upon user authorization information provided by both the new member and the manager of the private work group (e.g., establishing "acceptance" by a new member of an "invitation" by the group manager).

Figure 1:
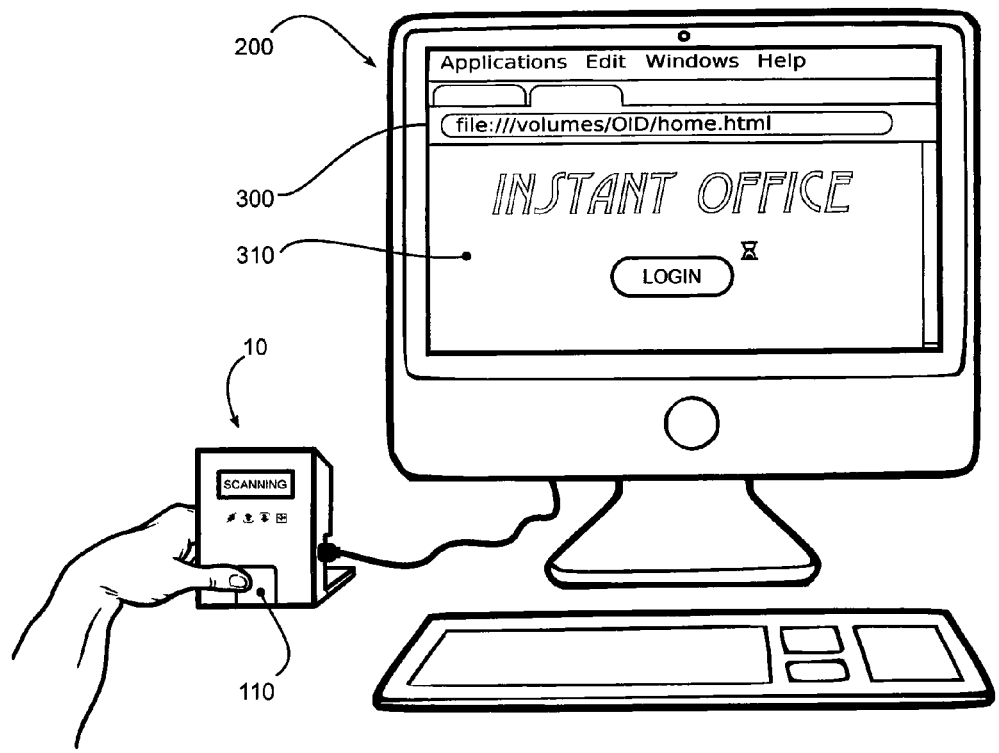
FIG. 1 schematically illustrates an office infrastructure device 10 launching and biometrically authenticating access into a work space 310 on a connected personal computer 200.

In a basic mode of operation, as shown in FIG. 1, the office infrastructure device 10 is used to launch and biometrically authenticate access into a work space 310 on a connected personal computer 200.

In particular, the office infrastructure device 10 includes a fingerprint scanner integrated into an "activation" button 110. When a user presses the button 110 to "activate" the device, the scanner contemporaneously captures the user's fingerprint image information. The captured data is then used together with the device's unique device identification code to access certain predefined functions and services.

Once the presented fingerprint data is captured, an authentication is performed to determine if the presented fingerprint data correlates acceptably with the stored fingerprint data. If so, an authentication key is activated or otherwise is provided. This authentication key is retained in memory, such that it can be polled by the device's applications, service, and function for use together the unique device identification code to permit further access thereto.

In a preferred embodiment, the authentication key is used to log into the work space, providing access to applications, services, and functions there under. User-installed third party ("after-market") applications, if incompatible, may require either additional authentication or re-authentication.

Upon disconnection, or after a predetermined time interval, the presented fingerprint data and authentication key are purged from memory. Renewed access back would require another presentation.

In certain embodiments, rather than solely in the course of work group and other multi-user and non-local downstream access, the biometric activation is programmed as a gate also to the "connection" of the device itself. The office infrastructure device does not launch its work space unless user authentication, established at an initial set up, is effected and passed. While power is supplied to the connected device from the USB, the user executable code contains a gating program that interrogates the device memory for the presence of registered user fingerprint data. The gate is lifted only upon computing acceptable correlation to fingerprint image data collected by the device itself.

Figure 2:
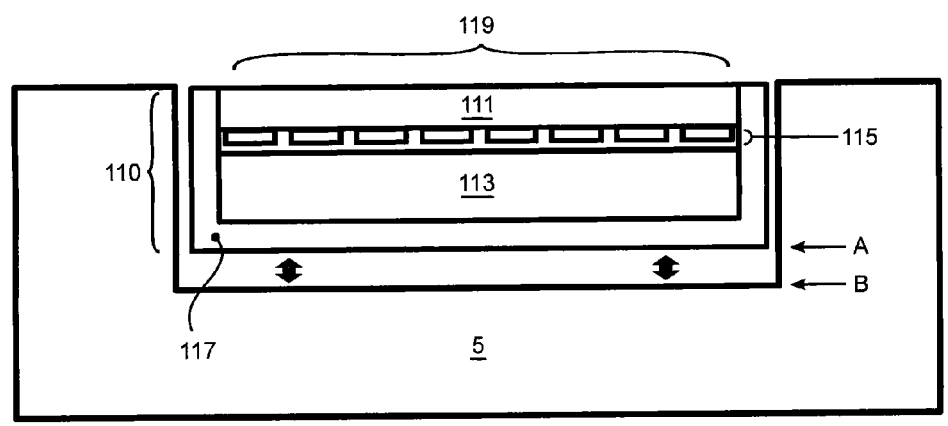
FIG. 2 illustrates schematically a cross section of an integrated fingerprint reader 110 used for authentication on an office infrastructure device.

As shown in FIG. 2, a preferred biometric activation button 110 comprises a capacitive fingerprint scanner 119 embedded within the button's body 117.

The biometric activation button 110 itself is seated within the device housing 5 such that it can be displaced between at least two positions A and B, representative of the device's activation states. For example, when seated at position A, the device's power supply circuits are "inactive" or "incomplete" (such as, a result of or influenced by a timing circuit or clock), thereby electronically defining an "off", "sleep", or "low power" state. When depressed to or towards position "B", these circuits are activated or otherwise completed to electronically define an "on", "wake" or "full power" state.

As depicted in FIG. 2, a typical capacitive fingerprint scanner 119 comprises a sensor array 115 interposed between a protective layer 111 (preferable formed of a durable scratch resistant material) and a scanner substrate 113 (typically, rigid durable silicon). As is well known in the biometric art, the sensor array 115 comprises tens of thousands of capacitor elements disposed with associated circuitry to enable the measurement of capacitance at each element. As the "ridges" and "valleys" of a finger placed upon the protective layer form points of "contact" and "non-contact", the resulting differences in capacitance at each element can thus be "image-wise" measured and recorded. Further details of such technology can be learned from U.S. Pat. No. 4,353,056, issued to C. Tsikos on Oct. 5, 1982; U.S. Pat. No. 5,973,623, issued to B. Gupta et al. on Oct. 26, 1999; and U.S. Pat. No. 6,512,381, issued to A. Kramer on Jan. 28, 2003.

Solid state fingerprint scanners other than those based on capacitance can also be employed. These tend at the moment to be more expensive, difficult to obtain, and are often technically less well developed and documented. Nonetheless, such alternatives include RF scanners; thermal sensors utilizing pyroelectric layers; piezoelectric scanners (e.g., U.S. Pat. No. 6,720,712, issued to W. G. Scott on Apr. 13, 2004); and MEMS based systems and their capacitance and resistance based hybrids.

Suppliers of capacitive and other solid state fingerprint scanners include Alps Electric Co., Ltd. (Tokyo, Japan), Atmel Corporation (San Jose, Calif.), AuthenTec, Inc. (Melbourne, Fla.), Casio Computer Co. (Tokyo, Japan), Cecrop Co., Ltd. (Seoul, Korea), Delsy Electric Components AG (Birkenfeld, Germany), Crossmatch Technologies (Palm Beach Gardens, Fla.), Safeguard Scientifics, Inc. (Radnor, Pa.), Ethentica, Inc. (Aliso Viejo, Calif.), Fidelica Microsystems, Inc. (Milpitas, Calif.), Fujitsu Ltd. (Tokyo, Japan), Idex ASA (Oslo, Norway), Melfas Co., Ltd. (Seoul, Korea), Mitsumi Electric Co., Ltd. (Tokyo, Japan), NEC Corporation (Tokyo, Japan), NTT Corporation (Tokyo, Japan), Nanoident Technologies AG (Linz, Austria), Silicon Display Co., Ltd. (Seoul, Korea), Sony Corporation (Tokyo, Japan), Symwave Inc. (Hauppauge, N.Y.), TesTech Inc. (Richardson, Tex.), TST Touchless Sensor Technology AG (Neu-Ulm, Germany), Ultra-Scan Corporation (Amherst, N.Y.), and Validity Sensors, Inc. (San Jose, Calif.).

As another alternative, rather than solid state scanners, optical scanners can also be employed. As is well known, these rely on small CCD cameras positioned to digitally photograph a finger pressed upon a rigid plate. The use of comparatively delicate camera optics can result in higher production costs. Need for an internal light source (e.g., LEDs) for photographic exposure can also increase the device's power requirements, as well as the component's thickness due to the need to meet appropriate focusing distances.

For both optical and solid state scanners, electronic wiring (not shown) traversing suitable opening(s) through the button body 117 is used to put the scanner 119 in electronic communication with the device's CPU 140. (See, FIGS. 3A to 3C). Electronic connection are also provided to supply power to the scanner from the USB port 130 or, if so fitted, from an internal battery (not shown).

To further describe the core features, components and operation of the device, attention is now directed to its representative embodiment 10 in FIGS. 3A to 3C, which includes a schematic component layout 100 thereof comprising data storage 120, a central processing unit 140, a system memory chip 150, and a communications bus 130.

The data storage component 120 provides non-volatile means for recording and reading data pursuant to device operations and functions. The data storage component 120 can be based on either magnetic disk drive technology (e.g., those developed and commercially available from Western Digital Corporation of Irvine, Calif.; and Seagate Technology, PLC of Cupertino, Calif.) or solid state drive technology (e.g., those developed and commercially available from Toshiba Corporation of Tokyo, Japan; and Samsung Corporation of Seoul, South Korea); or combinations of the two. Solid state technologies are currently preferred for office infrastructure device embodiments targeted towards users with comparably modest capacity requirements, but a heightened need for mobility and data access speed. Where two or more physical data storage components are included, the management, operation, and coordination thereof is mediated by the central processing unit 140, among other computational agents, operating pursuant to device's O/S.

Considering that the office infrastructure device and its resources are intended primarily for storing, managing, and sharing personal files and other user-generated data (as opposed to applications and other executables), the data storage component 120 should have sufficient capacity to satisfy the customary and foreseeable usage of the device by professionals, small business owners and employees, consultants, entrepreneurs, skilled artisans, and other advanced users. While requiring clearly much more than a system memory chip, the total capacity need not be massive. For small to medium-sized businesses, work groups, and entities that deal principally with numeric and textual data (e.g., documents, spreadsheets, and financial records), less than a hundred gigabytes could be sufficiently capacious to host the work product of a dozen or so users for several years. For larger entities and those that deal with multimedia files and uncompressed images, several terabytes of capacity may be needed.

In addition to data and files specifically generated by users, the data storage component is also used for recording and reading data used by the office infrastructure device (or one of its applications) in the course of its operation. Examples of such data includes O/S system files; private internet site connection data; user settings and operational preferences; security and authentication information; user and work group profiles, and private work group registries, permissions, and authorizations. Such data can be stored in different volumes, sectors, fragments, cells, or directories of the data storage component, hidden or otherwise separate from the user-generated files and data.

In a private work group comprising several office infrastructure devices, the individual data storage components involved therein—like other hardware components—need not have identical technical specifications. Data storage components of differing capacities, data access rates, and the like can be employed. The commercial availability of office infrastructure devices of tiered performance and technical grades can provide better fit and accommodation for expected variations in consumer usage. For example, a practical heterogeneous private work group system can be structured economically with a manager's device provided with data storage capacity exceeding three or more terabytes, whilst employee devices are each provided with smaller less costly capacity (e.g., two hundred to five hundred gigabytes).

Heterogeneity can also benefit sole practitioners, for example, in networks established by a single individual at two locations, such as connecting a more capacious office infrastructure device at one location intended to be permanent, and using another less capacious one to connect remotely.

With regards to the sharing and synchronization of personal data and files through the private internet site, the office infrastructure device is preferably configured such that not all personal files stored in the data storage will be shared, but rather only those selected by the user. This promotes greater user control over the distribution and accessibility of the personal files, as well as enables better user management of storage capacity at the private internet site. In a variation of this embodiment, particularly applicable to the multi-user environment of a private work group, the office infrastructure device is configured such that only files selected by the user to be shared among members of the user's group are synched at the private internet site.

With regard to user work files, in certain preferred embodiments, the office infrastructure device is configured to operate in a manner comparable to commercially available external hard drives. Thus, when "plugged in", the device is mounted or otherwise recognized by the host personal computer (via standard device installation protocols), thus providing a local user-accessible hard drive on the host computer. In other preferred embodiments, the office infrastructure device is configured such that user files and data recorded in the data storage component are accessible only through the work space, and for certain implementations, only after an authenticated login through said work space.

A "hard drive"-based data storage component can be partitioned into two or more separate volumes. Thus, for example, in one embodiment, a one terabyte drive is partitioned into 900 and 100 gigabyte volumes. The larger volume is then reserved for user accessible file and data, and the smaller volume reserved for device data and system level binaries. Since not intended to be accessed by a user, the system volume is secured or otherwise protected from inadvertent or unintended deletion or modification through the use, for example, of hidden or read-only directories, libraries, and folders.

Files, records, documents, and data destined for recordation in the storage component are often considered private, confidential, or proprietary to the practitioners who generate and rely on them for their practices. Maintaining security over such intellectual assets—such as preventing undesired access and distribution—is addressed to a notable extent by the device's unique identification code.

The unique device identification code is any data string; data array; or circuit-, hardware-, or signal-generated computation integrated or otherwise intrinsic to the office infrastructure device, and capable of uniquely identifying it from other such devices within the context of the invention. The unique device identification code is preferably encoded into a semiconductor chip hardwired among the device's components 100 and is machine-accessible from or otherwise machine-readable on a connected personal computer. In embodiments of the device that incorporate digital or cellular telephony, Ethernet, or other broadly adopted standards-based functionality, the unique device identification code can share, be based on, or be generated from the device's MAC address, IMEI or MEID numbers, or the like.

With regard to personal user data and files at the private internet site, the unique device identification code in certain preferred embodiments is required for authentication and access. That is, if so configured, without actual physical possession of the office infrastructure device, one is locked out and unable to access remotely any of the user data and files at the private internet site. Aside from promoting security, this arrangement substantially reduces the need for cumbersome knowledge-based login authentication procedures, which in turn facilitates the use of the device in a comparatively more "user-friendly", "login-less", "plug and play" manner.

Although using the device's unique identification code for authentication provides convenience, for embodiments with comparably more relaxed security requirements, secondary access means can be provided at the private internet site to address the possibility that a user's office infrastructure device is lost or damaged or otherwise unavailable. A secondary login gate mechanism, for example, can implement two and three factor authentication procedures involving knowledge factors (e.g., providing knowledge of files or user profile information); ownership factors (e.g., providing a unique device identification code, such as provided on an affixed label of an owned damaged device); and/or inherence factor (e.g., providing biometric data for comparison with previously-registered biometric data). For heightened security, authenticated access through a secondary login gate can be limited to reassigning, rebuilding (i.e., to the extent possible), and/or authorizing a new "replacement" office infrastructure device.

In certain embodiments, the unique device identification code is associated with a "user profile". The creation and association of such user profile data is preferably accomplished through the work space during the initiation of the office infrastructure device. The user profile data is preferably stored in the device's data storage component and can include the user's name, addresses, titles, authorizations, permissions, employee ID numbers, email addresses, telephone numbers, and the like.

In certain embodiments, user profile data is set to be either "public", "private", or "restricted". "Public profile data" is accessible to all authenticated users in a private work group. "Private profile data" is assessable only by or for the user.

"Restricted profile data" is accessible only to the user himself and a "manager" of a private work group.

The "restricted" setting is particularly useful for hierarchically structured private work groups, where such restricted user data (e.g., employee ID numbers, home address, home phone, rates and fees, payroll information, confidential contractual obligations, birth date, social security number, affiliations and licenses, etc.) is normally considered private but nonetheless operationally relevant to, for example, manager-level users.

Although authenticated access to the work space and data hosted on or through the private internet site is a computed function of the device identification code, other authentication factors can be included in the computation. In particular, another principal and desirable authentication factor is the satisfactory submission of appropriate login information (e.g., user name and password). Such login gates can be used to authenticate local access to otherwise inaccessible user files and data store in the data storage component and to specifically authenticate separate work spaces (and their data) for different private work groups.

Still other authentication factors can include a check of non-unique readable data, such as checksum values, registry values, version and revision identifiers and dates, synch logs and histories, and cookies and like digital residue from prior successful authentication attempts. These can be checked individually or as a group, in checklist fashion or for the detection of a predetermined pattern.

As shown in FIGS. 3A to 3C, the office infrastructure device 10 is throughout its operation linked peripherally to host personal computer 200, thereby establishing a digital data communications channel between the host 200 and the device 10. The device 10 is configured in this regard to integrate, conform, or comply with any of the known hardware interfaces and communication standards for peripheral devices, such as USB, IEEE 1394 ("Firewire"), the Intel "Thunderbolt" PCI, SCSI, SATA, and IEEE 802.11. For comparatively low bandwidth operations, Bluetooth and ANSI RS-232 and RS-422 (Serial Communications) can also be implemented.

Figure 6A:
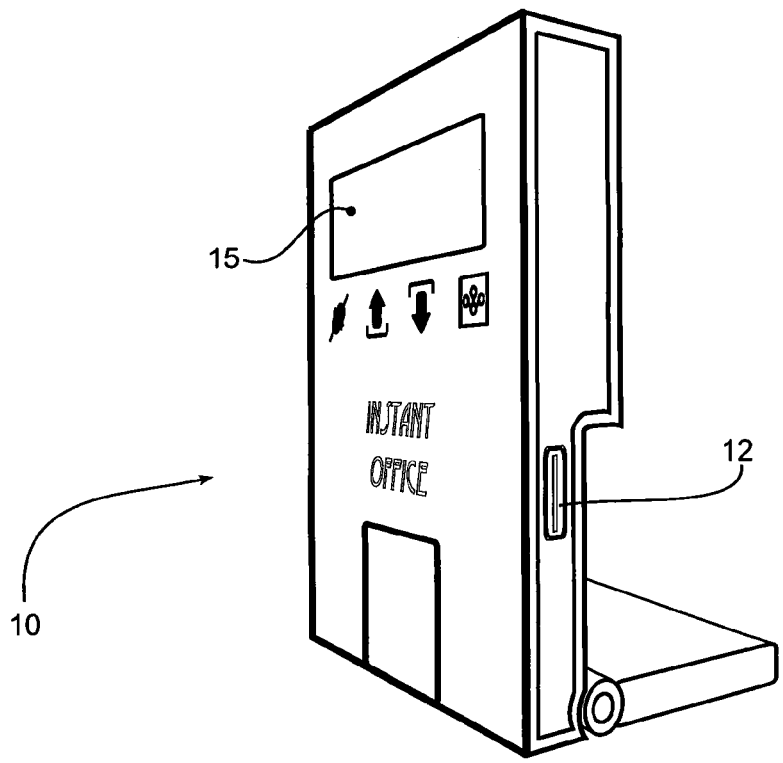
FIGS. 6A and 6B illustrate certain external technical features of the office infrastructure device in two of its embodiments.

Due to its breadth of adoption and likely availability on potential host personal computers, USB-compliant hardware interfaces are by far the currently preferred connection mechanism. As shown in FIG. 6A, the office infrastructure device 10 includes an eight-pin to thirty-pin USB-compliant socket 12 connecting internally to port interface 130. Connecting the office infrastructure device 10 to a standard USB port on a host personal computer 200 is accomplished using appropriate USB 2.0 and 3.0 compliant cables. Although local downstream data transfer rates will not normally be limiting, integration of the faster data transfer protocols can desirably extend the device's longevity and relevance over time as upstream data transfer speeds improve.

Once connected through its wired or wireless connection capability, the office infrastructure device is accessed through the host personal computer to launch thereon a user-definable work space. The work space provides a user interface for accessing personal user data and files stored both on the device itself and at a related private internet site. In the principal embodiment, the work space is scripted in HTML.

The advantage of adopting an HTML-based work space is the ubiquity and broad distribution of HTML-browsers, readers, and translators on personal computers. Examples of HTML browsers include "Internet Explorer" (developed by Microsoft Corporation), "Safari" (developed by Apple, Inc), "Firefox" (an open source browser developed by the Mozilla Foundation and contributors), Chrome (developed by Google, Inc.), and Opera (developed by Opera Software).

Despite varying sources and operating mechanics, HTML browsers are generally compliant with internationally set standards (i.e., the standards developed and promoted by the IETF and W3C), thus promoting broad compatibility of the device across a wide range of personal computer platforms and configurations. HTML browsers are also frequently updated and revised in the normal course of user maintenance, and often incorporate extensions and plug-ins (e.g., Java, PHP, Ajax, etc.) useful for supporting sophisticated device office applications and programs.

While the preferred embodiment uses an HTML-scripted work space, in other embodiments, the work space is configured to communicate with the host personal computer through a connector, receiver, translator, applet, device driver, or other like device applications installed thereon for the purpose of executing and supporting related user-executable code. To protect privacy, the installed device application is programmed to prevent, restrict, or otherwise regulate the retention on the host computer of any personal user data files accessed or involved in an online session. The device application is installed during an initial registration (or initiation) of the office infrastructure device or when logging into an unrecognized host personal computer. In either case, the device application is provided on, and thus downloaded and installed from, either the office infrastructure device or the private internet site.

Once connected, personal user files and data stored in the device (e.g., "doc", "txt", "pdf", "cal", "db", "odb", and "fmp" files) are accessible through the work space launched on the connected personal computer. Unless integrated into the work space (e.g., by installation therein of a specific office productivity application), other externally sourced applications (i.e., third party business and professional applications) may be used to open and work on these files, e.g., the Microsoft Office Suite, Adobe Creative Suite, Filemaker Pro, Quickbooks, Peachtree, and Apache OpenOffice.

In a private work group, the manager and group members can standardize among themselves which third party business and professional applications are to be used for the group's efforts. Cross compatibility integrated into several of these applications (i.e., the ability to read and save files in one third party application using another third party's format) will also facilitate collaboration amongst members having varying host personal computer software configurations and builds. Adopting opens source formats as a group standard can also promote compatibility among private work group members, as well as promote member mobility, as third party open source applications are typically offered at minimal to no costs and can be often easily downloaded and installed onto a host personal computer.

In a particularly useful commercial embodiment of a private work group, a professional office service supplier provides customers with temporary office space each equipped with personal computer specifically configured to substantially optimize the hosting of office infrastructure devices (e.g., incorporating a standardize set of device applications or browsers, as well as third party productivity applications). Preferably the professional office supplier will also provide the assets and resources (e.g., web servers, file/app servers, network data storage, etc.) of the private internet site, specifically configured to substantially optimize the access thereto from the supplier's offices. The office service supplier can further provides its customer with office infrastructure devices specifically configured to connect in an substantially optimized fashion to the supplier's office computers, whilst still allowing connection by users to other personal computers (e.g., home personal computers, as well as computers at another temporary office location provided by the office service supplier. By providing and centrally managing these OID work group components, the office service supplier can commercially differentiate its office services, as well as providing its customers with an additional layer or work group management that may otherwise be too complicated or costly for smaller entities to implement.

In certain embodiments, the office infrastructure device is provided with Wi-Fi and/or Bluetooth connectivity to provide an alternative wireless means for connecting the device to a host personal computer. Nonetheless, while such wireless connections are indeed well known and available, the exclusive use of a wired connection is currently preferred on the basis of their greater real and perceived security and to instill and promote a particular user experience and perception that underscores through use such security. In any event, Wi-Fi and Bluetooth semiconductor chips, if desired, are commercially available from Intel Corporation (Santa Clara, Calif.), Broadcom Corporation (Irvine, Calif.), and the Marvell Technology Group (Santa Clara, Calif.).

Figure 6B:
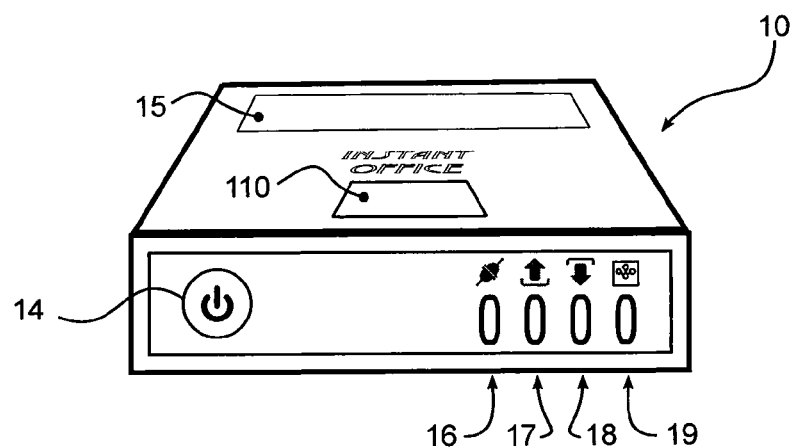

In certain embodiments, the office infrastructure device is also provided with an electronic flat panel display, preferably resistive or capacitive touch screens capable of being integrated and configured for user data input. For example, as illustrated in FIGS. 6A and 6B, an office infrastructure device 10 having physical dimensions of approximately 7.62×10.16 cm (3"×4") can incorporate a 3.8" 4-wire resistive touch screen display proximate the device's front panel 15. Touch screen displays are developed, manufactured, and supplied by, for example, Samsung Corporation (Seoul, South Korea), LG Electronics (Busan, South Korea), HTC Corporation (Taipei City, Taiwan), Huawei Technologies (Shenzhen, China), and E-Ink Corporation (Billerica, Mass.). The touch screen display can be driven using commercially available multimedia video chips, boards, and possessors, for example, the BCM2722 embedded multimedia processor available from Broadcom Corporation (Irvine, Calif.).

In certain embodiments, a power source—e.g., separate from the USB-based power circuitry—can also be incorporated. An integrated power source or supply is particularly useful for office infrastructure devices engineered for mobile standalone use and for those with large capacity data storage components exceeding the power capacities advocated under the USB standards. Addressing the former, an internal rechargeable battery can be included. Addressing the latter, an internal DC power source (such as fed through an AC inlet and converted or those based on the IEEE 802.3 PoE standards) can also be included.

In certain embodiments, the office infrastructure device itself is provided with external indicators (e.g., LEDs) for visually signaling to its user certain device operations and states. In the office infrastructure device 10 illustrated in FIGS. 6A and 6B, such signals are provided by illuminated power button 14 (e.g., signaling "on" and "off" states), connection indicator 16 (e.g., signaling a connection with the private internet site), activity indicators 17 and 18 (e.g., signaling the uploading and downloading of files and data from the data storage component), and online indicator 19 (e.g., signaling single-user and multi-user modes).

In the preferred embodiment, management of the hardware and operating software components of the office infrastructure device is effected through either an embedded or integrated device-specific operating system.

In FIGS. 3A to 3C, the operating system (O/S) 152 is encoded in the devices system memory 150 (e.g., non-volatile NAND flash memory), and executed through the device's central processing unit (CPU) 140, which itself is in communication with the device's I/O interface 130 and data storage 100. The O/S 152 provides the instructions, command line tools and utilities, and shell scripts (including variables, control statements, file I/O, pipes, redirection, and argument handling) that are used, for example, for monitoring and regulating data communicated between the office infrastructure device 10 and the host computer 200 through I/O interface 130; for operating and managing data (such as system and user files 122 and 124) stored and retrieved from data storage 120; and for supporting and communicating with other processes executing on the host computer, for example, in administrative system-level operations (e.g., the transmittal, processing, and receipt of unique device code in authentication processes) and user-level work space applications (e.g., responding to data calls issued from a file sharing or calendar application). In various embodiments, the O/S 152 is typically programmed to work in conjunction with detected device drivers installed onto the host personal computer.

For highly integrated devices, the O/S 152 can be embedded into the device's CPU 140, as well as provide or contain a substantial portion of the user-executable code that provides the work-space. This would be advantageous, with respect to operating efficiencies, in embodiments that do not utilize an HTML-based script stored in data storage 120, but rather, proprietary device-specific programming. In such embodiments, the embedded O/S 152 can contain, among other functionalities, application-specific routines and shells, a display emulator or other graphical user interface, LAN and WAN programming, and VPN and tunneling programming.

The specific programming of the O/S 152 will be subject to wide variation, several of the underlying technical and syntactical details and parameters being each subject to individual engineering decisions.

In any event, with regard to the authentication, the O/S 152 contains the instructions and system utilities for providing access, transmitting, or otherwise exposing the device's unique identification (e.g., a MAC-address) to the local host computer or private internet site, in response to connection state (e.g., as detected at the bus 130) or in response to requests, arguments or calls made from authentication-related programming executed locally or remotely.

Likewise, with regards to data storage management, the O/S 152 contains the instructions and system utilities for operating the device and for providing access, transmitting, or otherwise exposing its stored user and system files 122 and 124 to the local host computer or private internet site, in response to requests, arguments, or commands from programming executed locally or remotely. Other functionality that can be employed are discussed in or derivable from, for example, Int'l Pat. App. PCT/US2014/32418, filed by Nauzad Sadry on Mar. 31, 2014; U.S. Pat. Pub. No. 2012/0166685 (Jing Booth et al.) dated Jun. 28, 2012; U.S. Pat. App. Pub. No 2014/164870 (Yongke Sun et al.) dated Jun. 12, 2014; U.S. Pat. No. 7,809,682, issued to Toby Paterson et al. on Oct. 5, 2010; U.S. Pat. No. 7,593,782, issued to Jobs et al. on Sep. 22, 2009; and U.S. Pat. No. 7,797,633, issued to Christopher Lance Flick on Sep. 14, 2010.

The O/S 152 of the office infrastructure device in certain high-mobility embodiments can also be engineered to provide a defined set of stand-alone functions when disconnected from a personal computer. In these embodiments, the office infrastructure device is provided with integral data input and output component(s), preferably a touch screen with a virtual user interface integrated into a front panel 15 of the OID device 10. An independent power source (such as an internal battery or power port) would be needed for embodiments that either do not use USB for connection, or exceed the power supply capabilities of the USB connection. The preferred set of standalone functions include, but are not limited to email, event notices and alerts, and social networking functions provided under the preferred set of installed office applications discussed further below.

The "user executable code"—whether separate or independent from the O/S 152—comprises a programmed set of instructions provided through the office infrastructure device that is capable of being accessed and executed by a user through a connected personal computer, the execution using or otherwise involving the computer's and the device's microprocessors, libraries, and files.

While the user-executable code can be programmed to provide several functions and capabilities, its primary function is to launch a user-definable work space on the host personal computer.

Preferably, the office infrastructure device is engineered such that an icon or other graphical gateway linking to the user-executable code is revealed to the user automatically upon connection of the device to the host computer. Clicking or otherwise interacting with the icon or gateway by the user commences execution of the code to launch the user-definable work space. While the auto-detection of connected devices and associated requisite parameters are well known, certain potential personal computer hosts may use certain operating systems (or certain versions thereof) where the automatic launching of device applications and programs is restricted or otherwise unavailable. In such instances, a user may need to manually locate the user-executable code on a connected device using a file finder or file manager program on the host personal computer.

The user-executable code is programmed in any language and compiled in any format that is compatible with at least one of the major classes of host personal computer operating systems, i.e., Microsoft Windows, Apple MAC OS, and Linux systems. For broader compatibility, user-executable code should be substantially agnostic to the operating system of the host personal computer. This is accomplished by programming the user-executable code to execute under of through another computer program installed and running on the host personal computer, such an HTML browser. As suggested above, execution through an HTML browser is particularly preferred because its is found on virtually every personal computer operating system, and uses a standardized HTML programming language.

In other embodiments, the user-executable code is programmed in architecture-neutral programming language to be executed using a locally installed execution program. The local execution program is made available separately, either on the internet or on the device itself, such that users can download, transfer, or otherwise install it onto a prospective host personal computer to enable the execution thereon of the device's user-executable code, and thereby, the launching and use of the user definable work space, concurrently with any appropriate user privacy safeguards.

The "work space"—as the term is used herein—encompasses any graphical user interface directly or indirectly executed on the host computer by the office infrastructure device that enables access into and user control of the device's applications through interactive fields, menus, buttons, and like user data input mechanisms. It is through the work space that the user drives forward the functions of office infrastructure devise.

The work space is "user-definable" in the sense that among its collection of interactive input mechanisms, there is included at least one mechanism that enables the device user to customize substantive work space functionality and behavior, and in particular, to modify the substantive (i.e., non-cosmetic) operation of any one or more of the pre-installed user applications, thereby effecting the inclusion and exclusion of private or shared user data presented on the work space by the customized user application. Key examples of substantive customization include the addition and removal of members of a private work group; and defining user and shared data access privileges to members of said private work group.

The work space, while requiring the office infrastructure device for initial authentication and launch, need not rely exclusively on the integrated assets and resources of the device to perform its functions. Both the work space and its installed user applications can be configured to perform certain functions using routines and processes at the host computer, at the private internet site, or at a communicatively-linked external third party server. As to the latter, work space installable office applications can be configured to interface with authorized third party servers (e.g., through an API) operated by administrative and regulatory agencies (e.g., IRS, OSHA, SEC, and PACER), industry organizations and data consolidators (e.g., National Assoc. of Realtors (MLS), Saber, and TravelPort), professional SAS providers (e.g., accounting, billing, payroll, collaboration, time management, and web services); and commercial service providers (e.g., financial institutions and insurance companies).

As indicated, in the primary embodiment, the work space is presented on the host personal computer through an internet browser, the result of the host browser executing the HTML script and any associated data files stored both locally on the device's data storage component and, assuming subscription by the user, remotely at the private internet site.

In the context of a single user, the local and remote HTML scripts are in the primary embodiment substantially identical, one being a synched version of the other. In the context of a multiple-user work group, the local and remote versions of the HTML script can also be substantially identical with respect to the manager of the private work group. Nonetheless, local customization of the work space—within manager-authorized parameters—can be accomplished by authorized members of the private work group through selection of their desired user settings.

Although the work space can be engineered in different embodiments to provide different user functions, basic functionalities will fill either or both of the following fundamental needs: (1) "single user access" to stored private user data; and (2) "multiple user access" to stored shared user data.

"Single user access" relates in particular to the capacity of the work space to enable a user to access (e.g., read, write, search, browse, export, import, copy, paste, duplicate, replicate, and save) personal user data on the device's data storage component. Access can be either deliberate (such as a user-actuated listing of user files in a file management function or application) or incidental (such as the reading and processing of stored user data by operation of a user-executed application or function).

Figure 4A:
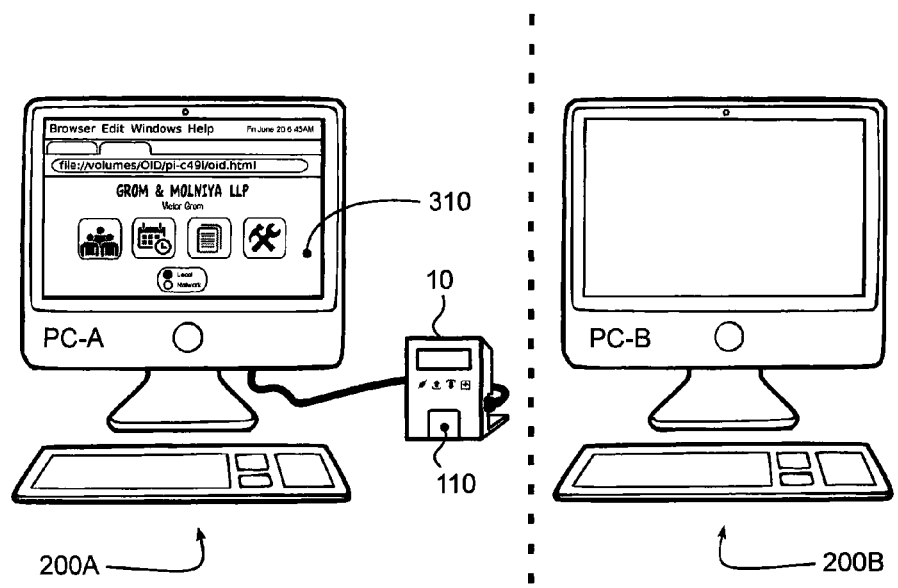
FIGS. 4A and 4B illustrate the office infrastructure device 10 connecting at different instances to personal computer 200A and personal computer 200B.
Figure 4B:
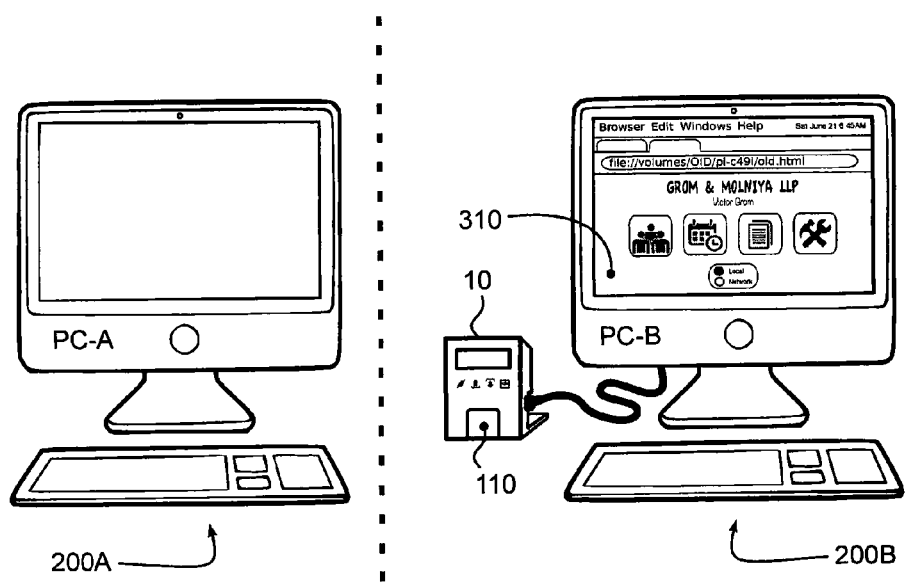

In embodiments where the work space is configured solely for "single user access", said access is combined with additional access to a private internet site for hosting data from the device's data storage component. Such embodiments could provide utility for independent and sole practitioners, agents, and consultants that may not have a need for establishing private works groups or sharing files with collaborators, but nonetheless desire a stable, mobile, secure, and adaptable office infrastructure. (See e.g., FIGS. 4A and 4B). Combination with and access to the private internet site access provides a good platform for securely synching personal user files and documents, as well as providing a foundation for delivering new updates, versions, modules, and applications that can be installed or otherwise integrated into the work space.

"Multiple user access" relates in particular to the capacity of the work space to enable a user to create, manage, or join a private work group for sharing among its authorized members data stored on the device's data storage component. Like the file synching and backup functions in the single user scenario, multiple user access is also preferably effected through a private internet site.

Figure 5:
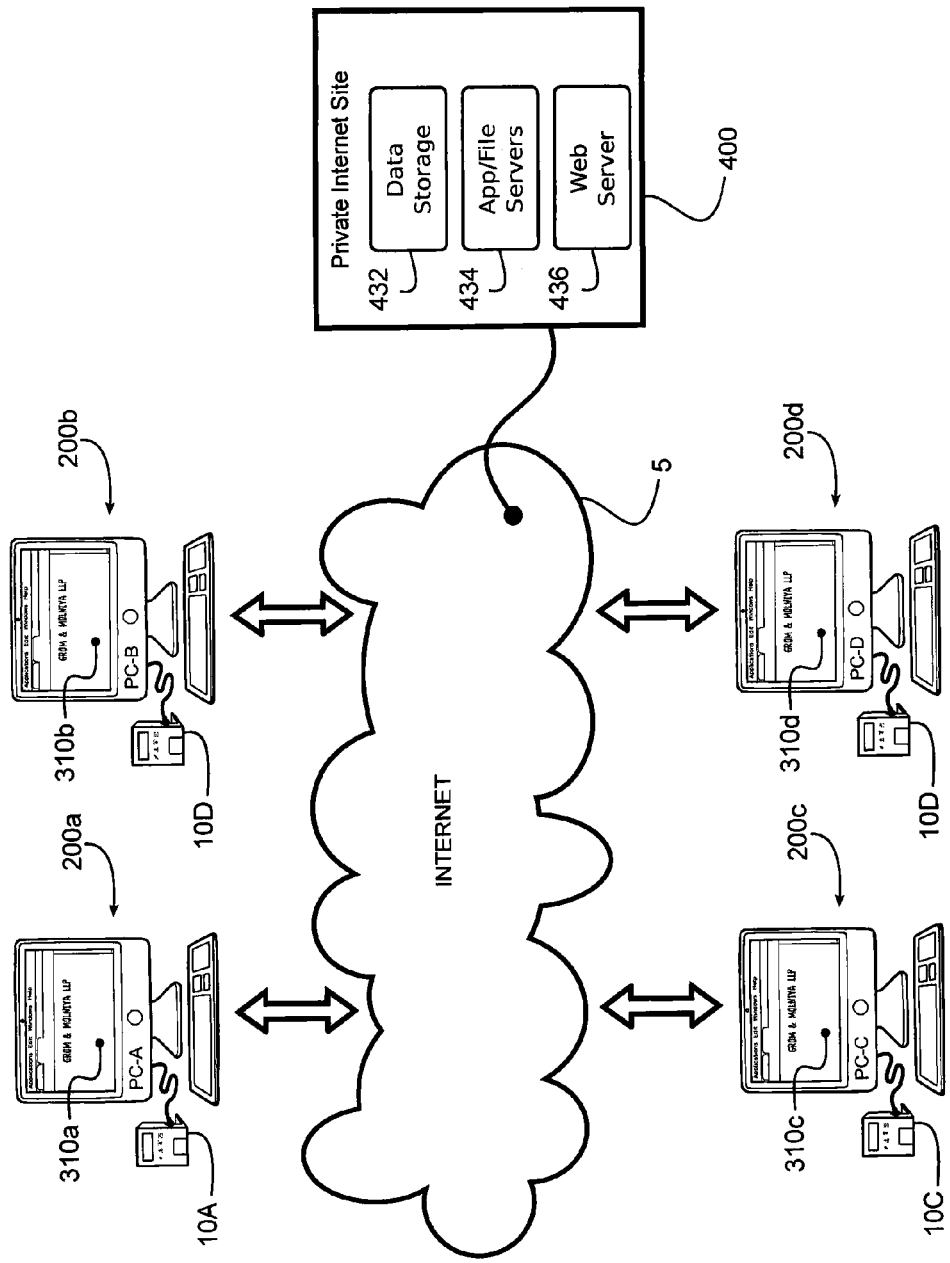
FIG. 5 illustrates office infrastructure devices 10A, 10B, 10C, and 10D, each connected respectively to computers 200a, 200b, 200c, and 200d, forming a private work group through private internet site 400.

In particular, as shown in FIG. 5, a private internet site 400 comprising internet data storage 432, application and file servers 434, and web servers 436 is accessed on the internet 5 to several members of a private work group, i.e., office infrastructure devices 10A (group coordinator and manager), 10B (member), 10C (member), and 10D (member), each connected respectively to computers 200a (site creator and manager), 200b (member), 200c (member), and 200d (member). Each authorized member of a private work group, having appropriately logged in at private internet site 400, is thus able to share and contribute files, documents, and data to the work space 310a created and managed by the group's creator and manager though office infrastructure device 10A.

As each office infrastructure device has the ability to create its own private work groups at the private internet site 400 (cf., "modularity"), navigation into a particular private work group (such as private work group 10A) by a member is effected at the member's work space 310 through a group selector interface 312. (See, FIG. 3A). If the private work group is managed by another member (i.e., the managing member), access will be determined by both the unique identification code of the visiting member's device and an authorization or other authentication code issued by the managing member. The login and authentication process can be accomplished by the web server 436 at the private internet site 400.

Once authenticated and logged into the private work group, an authorized member can use and access shared data resources, as well as participate in any collaborative activities enabled by the member's installed user applications (e.g., group calendars, social networking, video teleconferencing, an real time group document creation). Although a visiting member's work space will be influenced largely by parameters set by the managing member—particularly with respect to basic visual appearance, layout, and the use of proprietary brands or logos—individual user customization can be provided through a work space preferences and setting interface. See, e.g., FIG. 11. Accordingly, members logged into a private work group will not necessarily have identical work spaces. Aside from individual user customizations, variations can also ensue from local factors (e.g., host personal computer specifications and browser or receiver type and version.)

The software components responsible for providing "multiple user access" on the work space can be present in the office infrastructure device itself, the private internet site itself, or both. With regard to the latter, the code on the device can comprise only those elements necessary to navigate to the private internet site and authenticate the device, with the substantial bulk of the others components needed to provide, manage, and coordinate the "multiple user access" being integrated into and executed on the servers 434 and 436 of the private internet site 430.

In an alternative embodiment, all or some of the multiple user access software components are downloadable or otherwise available from the private internet site, but not installed or otherwise operative until demanded by the users, e.g. by user subscription.

The "private internet site", as disclosed herein, comprises an external internet-accessible system of computing resources that provides or otherwise supports the data management, sharing and networking functions associated with a single office infrastructure device (i.e., the device owned by a solo practitioner or the device owned by a manager of a private work group). The private internet site can be deployed through an infrastructure comprising data servers, file servers, application servers, authentication agents, data synchronization agents, routers, web servers, and data storage. The infrastructure can be shared or private. But, in either event, each private internet site will have its own unique home URL address. A single office infrastructure device can be associated with, and thus be used to manage several private internet sites. A single private internet site, however, will only be associated with, and thus manageable through, a single device.

The unique association of a private internet site to an office infrastructure device is a function of otherwise related to the device's unique identification code, which upon site creation is matched either directly to the site's unique URL address or indirectly thereto through a unique customer account provided by a site service provider. Although each site is associated with and managed by a single device, the site can be accessed by others navigating to the site's URL address. When a non-managing device is used to connect to a site associated with and managed by another device, authentication pursuant to manager settings is conducted prior to granting any further substantive access, thus securing the "privacy" of the "private internet site".

Although the private internet site can utilize shared internet infrastructure operated by a commercial service provider, comparatively greater security and privacy is attained using private infrastructure components, such as private web, data, and application servers. In such embodiments, the use of private internet site infrastructure components would be comparatively more costly and complicated to implement, but affords greater latitude for site configuration. For example, rather than deploying an HTML-based work space for accessing and sharing data, a non-HTML or otherwise proprietary intranet model, including VPN and VPN tunneling protocols, can be implemented. The likely costs and complexity associated with such embodiments may foreclose the participation of comparatively smaller entities. For larger or more technically-adept entities, such embodiments can be advantageous with respect to privacy and security or, for example, for a large corporation or business with an existing private intranet infrastructure that wishes to, for example, provide alternative means for accessing and sharing files between in-house staff and external "telecommuters" or outside consultants possessing, equipped or supplied with their own office infrastructure device.

In certain embodiments, the private internet site can be configured to permit access without use of an office infrastructure device, such as by alternatively requiring secured passage and clearance at a login gate.

Nonetheless, for purposes of the preferred embodiments, wherein in security is of paramount concern, the private internet site is configured to be accessible only when an office infrastructure device is detected. From a user experience design perspective, such mechanism can create a semblance, virtualization, or perception of badge-regulated attendance at a traditional office environment. Aside from its resultant security benefits, this can be particularly advantageous in certain hierarchical multi-user contexts inasmuch as it imposes a group discipline that may be desirable for formalizing or otherwise regulating subordinate member activity.

Sufficient private data storage space for the private internet site is allocated to hold or otherwise host individual user and private work group data originating from both the managing office infrastructure device, as well as the devices of authorized members of associated private work groups.

For text and document-based businesses and organization comprising less than 20 or so members, ample total online storage capacity, sufficient for years of practice, may be less than a terabyte. If more capacity is involved, the internet site can be arranged to simply take note of user files and data available for sharing, and have certain of those (particularly those used infrequently) uploaded and downloaded only when needed, rather than have them always synched and backed up. This would of course require the online presence of any user or member possessing such personal user files and data. But, despite any potential inconvenience, site storage space requirements can be reduced considerably under such regime.

Alternatively, as suggested above, where shared files are many and large, the private internet site can provide access, not through online file synchronization and backup, but rather through site created VPN and VPN tunneling modalities.

Within the work space, there is provided at least one office application that itself provides some office infrastructure related function, and for the purpose of doing so, is provided with local and remote access to the data pulled directly from the data storage. The office application uses in its execution and operation the files, records, and other like user data. Certain fragments of the user data implemented may be locally read from and written on the connected office infrastructure device; others from and on the associated private internet site; and still others from and on authorized an online member devices. The office application may work on data from some or all of such sources, depending on its function or on the particular circumstance.

In the typical embodiment, more than one user application is provided.

In particular, the preferred office infrastructure device embodiment is initially configured with a default suite of pre-installed office applications, targeting certain functions and operations likely to be of utility to small and medium sized professional enterprises, such as a file sharing and synching application, a group messaging or social network application, and an event tracking system or group calendar. Also included among preferred default user applications is a user customization application that enables the configuration and setting of personal preferences, whereby a user can effect the layout, presentation, and operation of the office infrastructure device work space, as well as the other user applications installed thereon.

In addition to the default application, externally-developed applications can be made available externally and installed when desired at a later time. The work space itself can itself link to one or several online stores, libraries, or other like sources through which third party and after market applications can be searched, reviewed, purchased, and downloaded.

An installed application need not contain all code and assets necessary for its execution and function. For example, a user application can merely provide a link to another service or website that is appropriately compatible and appropriately configured to run within the device's work space or an integrated window, portal or shell provided therein.

FIGS. 7A to 11 provide a representative example of a work space, including examples of preferred office applications therein.

Figure 7A:
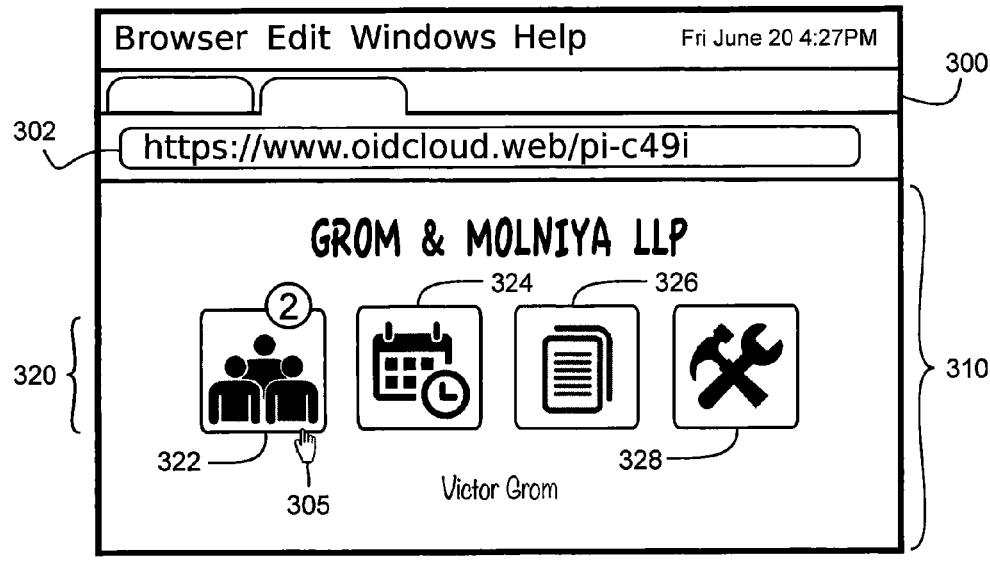
FIG. 7A illustrates an initial landing page of work space 310, the work space accessed on a host personal computer through the office infrastructure device 10 illustrated in FIGS. 3A to 3C.

As shown in FIG. 7A, a starting page for the work space 310 for a firm herein entitled "Grom & Molniya LLP" is accessed at a secure home URL address 302 using a browser 300 and includes clickable buttons 320 leading to social network application 322, file sharing application 326, calendar application 324, and settings application 328.

Figure 7B:
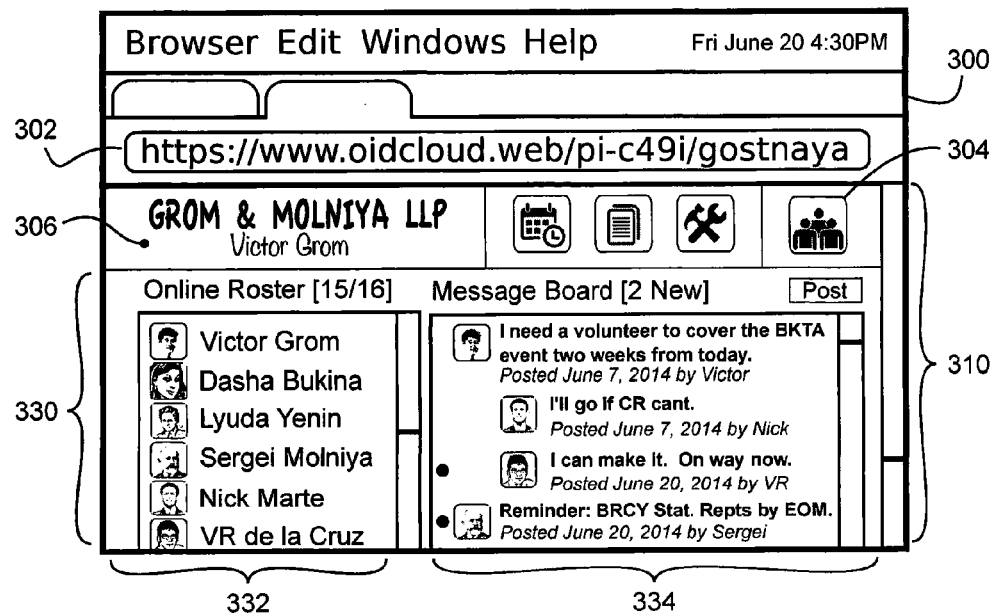
FIG. 7B illustrates a "social networking" application 330 provided on work space 310.

The social network application illustrated in FIG. 7B is accessed by pointing the cursor 305 onto and clicking button 322 as shown in FIG. 7A.

A "social network" application, as provided herein, is any software-based application that connect two or more members into a group, wherein each member of the group is provided through the application with a user interface for individually broadcasting and receiving information to and from other members of the group, and wherein such "sharing" of information is substantially a function of the individual's membership within that group. Aside from soft UX features and advantages, the social network application can be designed to provide important management functions, such as member attendance and work activity monitoring.

As shown in FIG. 7B, the social network functionality 330 on work space 310, is accessed at secure HTML address 302 through browser 300. The social network functionality 330 is bordered by header 306, the header displaying an organizational badge and name of the current user (i.e., "Victor Grom"), as well as navigation buttons that use the same iconography used in the starting page in FIG. 7A. The rightmost navigation button 304 (i.e., the social network icon) indicates the current work space functionality. The organizational badge can be scripted to include a hotlink back to the starting page in FIG. 7A.

The social network functionality itself comprises an online roster 332 and a message board 334.

The online roster 332 indicates which members of a private work group are currently connected and logged into the virtual office, displaying in particular thumbnail photos and names of each such available member. An attendance count (cf., the ratio "15/16") is also provided to give the user a quick way to determine how many members (cf., "15") from total membership (cf., "16") are online. Preferably, the available members identified on the roster are "clickable" to execute an "instant" chatting pop-up window, such as IM, IRC, or other like real time messaging service.

The message board 334 essentially provides a forum where the user and other members of a private work group can post messages, alerts, notices, requests, and the like to either the entire community or selected members thereof. As with current social network applications, the message board 334 of one user will likely differ from the message board of another user, despite including messages common to both.

The operation of the user's message board 334 (e.g., access, posting and viewing permission, archiving, etc.) is managed through the "settings" application. Additional controls can be integrated into the posting button script process, for example, the selection of a predefined distribution list provided as an option in the course of posting a new message.

Whereas the "social network" application provides a base for communicating active, emerging, and breaking information among members of the group on a real time or otherwise current basis, further team cohesion is promoted through a "file sharing" application that provides bases for coordinating and distributing stored data files and archived information among members of the group. For fledgling solo enterprises, wherein private work groups have not yet been established, the synchronization processes underlying the file sharing application provides individual user benefit through file backup and redundancy capabilities.

Figure 8A:
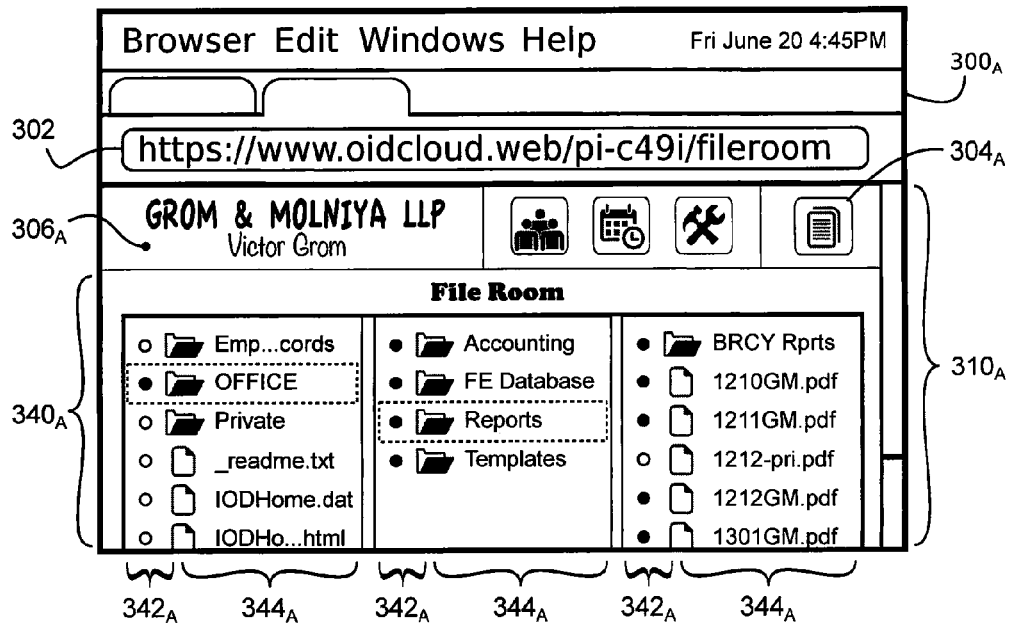
FIGS. 8A and 8B illustrate and compare "file sharing" applications 340a and 340b provided on work spaces 310a and 310b accessed by different users using their own office infrastructure devices.
Figure 8B:
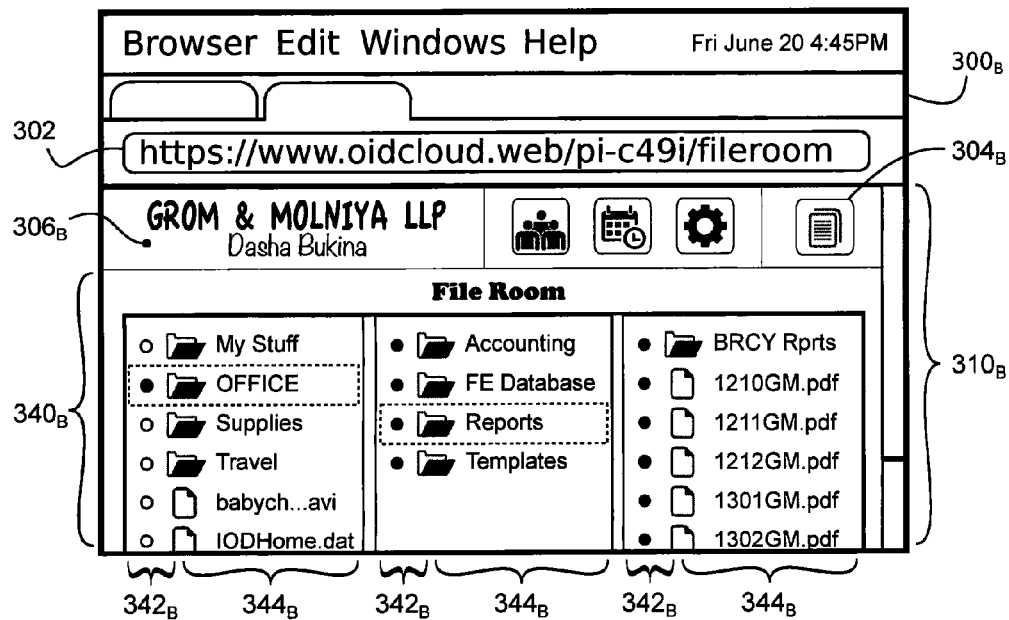

The "file sharing" application illustrated in FIG. 8A is accessed by pointing the cursor 305 shown in FIG. 7A onto and clicking the "file sharing" icon 326.

The "file sharing" application, as envisioned herein, is defined as any software-based application capable of providing a directory, catalog, index, register, library or other list of and access to one or more portable user data files 122 stored on the data storage 100 of one member's office infrastructure device 100 to another authenticated user within that member's private work group.

The access provided by a file sharing application can be "direct" or "indirect". "Indirect access" involves the synchronization of local user files with the private internet site (cf., cloud storage). In contrast, "direct access" will involve, for example, the use of a dedicated server and a VPN tunnel.

The personal user files and data targeted for sharing through a file sharing application are those compatible with and thereby "openable" through an extrinsic software application, such as document files (e.g., .doc, .txt, .pdf, .ppt, and .html files), media files (e.g., .qt, .ps, .jpg, .avi, .wmv, and .svg files), spreadsheets (e.g., .xls and .xmlss files), databases (.db, .odb, and .fmp files), and financial data files (e.g., .qdb and .slp files); as well as other device-installed office productivity applications.

A representative "file sharing" application is illustrated in FIG. 8A. As shown therein, the file sharing functionality 340a on work space 310, is accessed at secure HTML address 302 through browser 300. The file sharing functionality 340a is bordered by header 306, the frame displaying an organizational badge and name of the current user (i.e., "Victor Grom") 306a, as well as navigation buttons that use the same iconography used in the starting page in FIG. 7A. The rightmost navigation button 304a (i.e., the file sharing icon) indicates the current work space functionality.

The file sharing functionality 340a itself comprises a list 340a of the data files 340a, including both user files (e.g., "pdf" files) and system files (e.g., "dat" file), stored on the user's OID data storage 120. Although the list 340a is shown in columnar format, other well known formats (such as nested directories) are available, as are sorting orders and hierarchies. Tick boxes 342a are associated with each of the folder and files on the lists, that are scripted to enable the user to designate which of the files and folders are shared with the group (i.e., ticked) and those that are private (i.e., unticked). In the example, ticking a folder will automatically tick all underlying files. The individual files, however, can later be unticked (i.e., made private) if desired.

When a particular file is designated shareable (i.e., "ticked"), any member of group will have access to this file through their office infrastructure device. Thus, as shown in FIG. 7B, the files and folders 344B listed in association with an office infrastructure device owned by user 306B (i.e., "Dasha Bukina") overlaps with, but is not identical to, the files and folder 344A listed on the office infrastructure device owned by user 306A (i.e., "Victor Grom"). In particular, as evident from the state of the tick boxes 340A and 340B, the "ticked" files are shared by both, while the "unticked" files remain private with each.

The particular underlying software processes involved in the sharing and designation of files as public and private are subject to variation. In one embodiment, all files designated as "public" by a user, are automatically uploaded onto the private internet site, then synched to the office infrastructure devices of each authenticated user when they are logged in and connected. Alternatively, to reduce bandwidth and preserve cloud storage space, a file register existing at the private internet site maintains only file names and version information for all shareable and private user files, with uploading and downloading of files occurring only when another authenticated user specifically requests a shareable file. Other variants involving the degree and frequency of file syncing, both with respect to the individual and with respect to the group, can be implemented.

Whereas the file sharing application provides a base for coordinating and distributing data and information among members of the private work group, a calendar application can be used to organize, prioritize and schedules tasks and events, as well as coordinate the efforts of a private work group.

The calendar application, as provided herein, is defined as any software-based application capable of presenting a schedule of events (such as meetings, alerts, deadlines, due dates, milestones, anniversaries, holidays, and personal absences) onto an OID work space. Other desirable functions include: The addition and removal of events on said schedule, including tools for designating the events private or public; the scheduling of meetings among members of the group, including tools for initiating, accepting, rejecting, cancelling, rescheduling, repeating said meetings; and the filtering and sorting of private and public events, and other like setting of viewing preferences.

Figure 9:
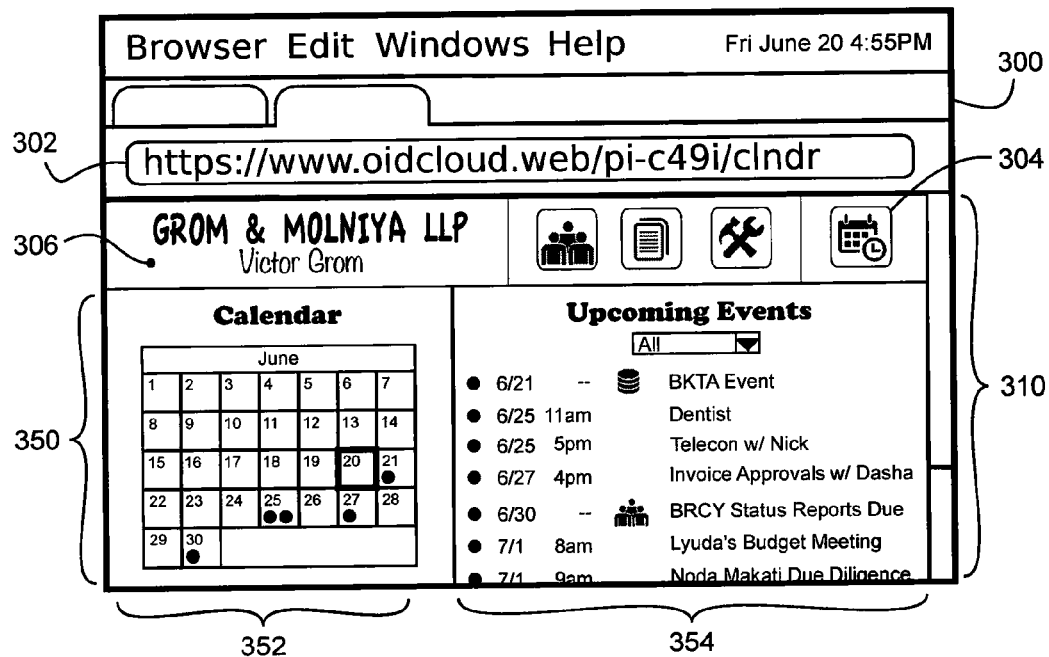
FIG. 9 illustrates a "calendar" application 350 provided on work space 310.
Figure 10:
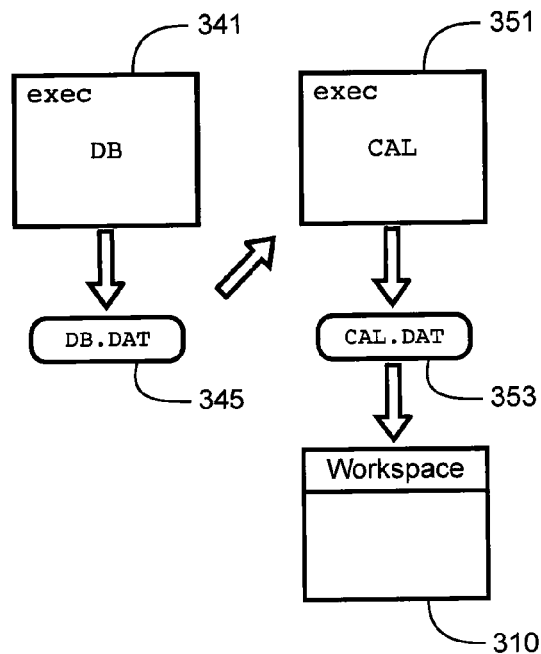
FIG. 10 illustrates the use of an extrinsic database 345 for populating events in a calendar program 351.

A representative "calendar" application, illustrated in FIG. 9, is accessed by pointing the cursor 305 shown in FIG. 7A onto and clicking the "calendar" icon 324, directing browser 300 to secure HTML address 302. The calendar functionality 350 thus presented is bordered by header 306, the header displaying an organizational badge and name of the current user 306, as well as navigation buttons that use the same iconography used in the starting page in FIG. 7A. The rightmost navigation button 304 (i.e., the calendar icon) indicates the current work space functionality.

The calendar functionality 350 itself comprises a visual calendar 352 and a schedule of events 354. The visual calendar 326, shown in its user-selectable monthly view, includes bullet point indicators on each respective date where an event is currently scheduled. The schedule of events 304, includes a drop down menu for filtering public and private events. Shown with "All" events selected, the schedule includes, relative to user 306, the following: Personal/private events that appear only on the user 306's work space (e.g., the June 25 and June 27 events); public events that appear on each member's work space (e.g., the June 30 event, marked with the group icon); and imported events that could be set as either public or private (e.g., the June 21 event, marked with the data storage drive icon).

With regard to imported event, as shown in FIG. 9, the calendar application 351 can be programmed to automatically import calendar-related information periodically from data 345 originated from an external database application 341. The extrinsic database, can be a contact list with client birthdays, or a customer database with service and delivery dates; or a patient list with checkup reminders; or a legal docket with tickler dates. The information is ultimately absorbed into the calendar application's data 353, which ultimately produces, when called by the user, the user's calendar on work space 310.

The import functions of calendar application can comprise call requests for extrinsic calendar related data, filters, libraries, and tables associated with or for said data; algorithms for processing and interpreting said data, and integration and display codes for presenting that data on the application's calendar.

Figure 11:
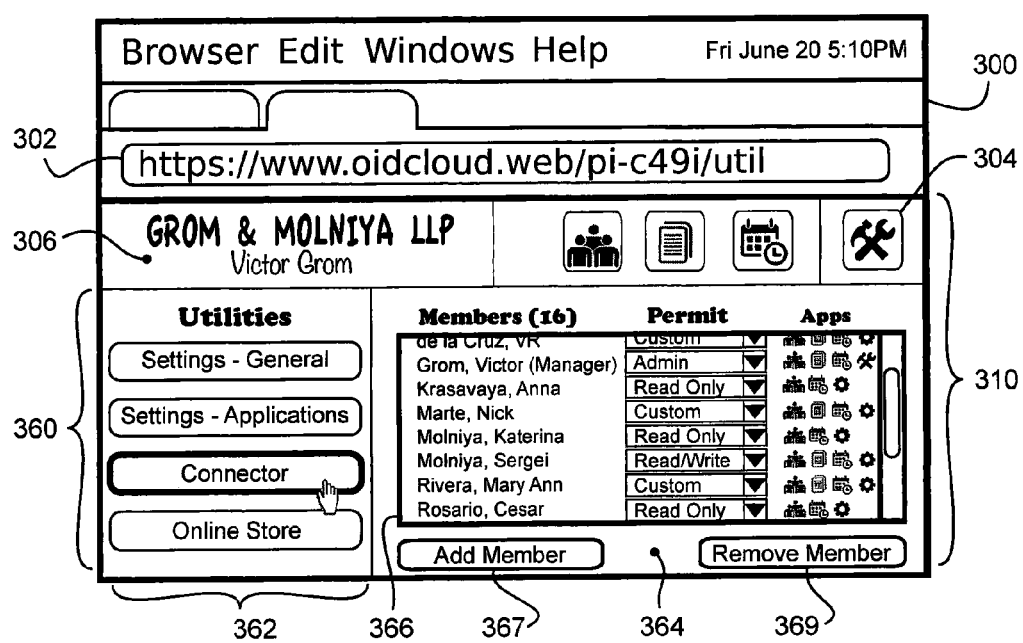
FIG. 11 illustrates a "user settings" application 360 provided on work space 310.

Certain operation, parameters, and settings for the "social network", "file sharing", and "calendar" application preferable are defined by the user through a "settings" application, a representative example of which is illustrated in FIG. 11, and which is accessed by pointing the cursor 305 shown in FIG. 7A onto and clicking the "tools" icon 328.

The "settings" functionality 360 is bordered by header 306, the header displaying an organizational badge and name of the current user 306, as well as navigation buttons that use the same iconography used in the starting page in FIG. 7A. The rightmost navigation button 304 (i.e., the "tools" icon) indicates the current work space functionality.

The "settings" functionality itself include navigation button to several utilities 362: i.e., "Settings—General", "Setting—Applications", a "Connector", and an "Online Store".

"Settings—General" utilities can include the input tools, fields, and forms for defining broader operational and system parameters and preferences, such as synchronization and backup frequency, user profile and account information, display preferences, local and remote data storage limits, and authentication and identification policies and information.

"Setting—Applications" utilities can include the tools, fields, and forms for defining the comparatively more specific preferences and parameters associated with the OID applications, such as enabling or disabling application-originated pop-up alerts; authenticating, identifying, associating, or linking an external data base for importation by an installed application; setting text, date, and currency formats that are specific to particular installed applications; and for defining application-specific privacy settings.

The "Connector" utility is preferably programmed to appear in the setting application only for users that are designated as "managers" or otherwise have appropriate administrative credentials and permissions. When the connector navigation button is activated—as shown in FIG. 11—a list 366 of all the member of the user/manager's group is displayed on the connector utility 364 presented on work space 310. For each member of the group, the manager is provides with the input tools for setting each members permissions and accessible applications. The manager is also provided with tools 367 and 369 for adding and removing members from the group, respectively. The process underlying the addition of a new member is described above is essentially a bilateral process involving the transmission and acceptance of an invitation within the system between two OID users. Removal of a member is essentially a unilateral cancelation, withdrawal, deletion, or termination by either user.

Finally, an "Online Store" utility is provided to enable a user to review, purchase, download, and install other device compatible office productivity applications. This enables device users and groups to add functionality beyond that provided by any pre-installed office infrastructure device applications, for example, to specifically tailor the capabilities of their virtual office to particular fields of industry.

In this regard, particularly useful applications for small business owners are financial applications that enable the creation, tracking, and management of records, data, and documents relating to accounts, assets, inventory, invoices, payroll, customers, and clients. The ability to create, submit, and track invoices is particularly key for fledgling professional practices and newly initiated small enterprises.

Another particularly useful class of applications are business-specific database applications. For example, a real estate database application can be programmed to record and manage real estate listing information, contact lists, and open house and closing schedules. Likewise, a legal or professional database application can include case file information, client information, and docketing information. Similarly, a contractor database can include customer and project information, supplier information, and work and worker schedules. By providing a distribution channel for these and other like specialty applications on an "online store", users are spared the costs and time associated with in-house design, whilst creating a market and incentives for independent programmers to develop and supply such niche applications.

Finally, another particularly useful class of application for small businesses entities are website creation and management applications, which can be used among other things to create an internet presence or an ecommerce storefront. Such applications can be executed exclusively through the device system or, more preferably, linked to services currently provided by external commercial website developers, registers, and hosts. The resulting website functionality can be combined or otherwise integrated with preselected functions of the device's associated private internet site, e.g., the automated updating of a public ecommerce storefront with data hosted on an installed non-public field-specific database application.

Since certain changes may be made in the above products and processes without departing from the scope of the invention herein involved, it is intended that all matter contained in the above description or shown in the accompanying drawings shall be interpreted as illustrative and not in a limiting sense.

The invention claimed is:

1. An office infrastructure device connectable to a host personal computer to execute thereon a user-definable work space, the office infrastructure device comprising:
   (a) user-accessible data storage for storing user files and data, the data storage being accessible through said user-definable work space;
   (b) a unique device identification code;
   (c) a biometric login system capable of sensing a preselected biometric indicia of a user for computation of user biometric authentication data; and
   (d) user-executable code scripted to launch said user-definable work space on said host personal computer, wherein the user-definable work space provides access to both (i) user files and data stored in said user-accessible data storage and (ii) a private internet site for synching user files and data from said data storage, and wherein said access to said data storage and said internet site is provided as a function of both said unique device identification code and said user biometric identification data.

2. The office infrastructure device of claim 1, further comprising
(e) a power or activation button manipulable by a user between first and second positions to effect power supply within the device,
wherein the automated biometric login system comprises a fingerprint scanner capable of image-wise reading a user presented fingerprint, the fingerprint scanner being integrated into said power or activation button.

3. The office infrastructure device of claim 2, wherein the fingerprint scanner is a capacitive fingerprint scanner.

4. The office infrastructure device of claim 2, wherein the user biometric authentication data is usable, through the device, to authenticate the user on an internet site or web application external to said user-definable work space.

5. The office infrastructure device of claim 2, wherein the user biometric authentication data is callable by an application installed and executing in said user-definable workspace to authenticate the user.

6. The office infrastructure device of claim 2, wherein the fingerprint scanner is callable by an application installed and executing in said user definable work space to authenticate the user.

7. An office infrastructure device connectable to a host personal computer to execute thereon a user-definable work space, the office infrastructure device comprising:

(a) user-accessible data storage for storing user files and data, the data storage being accessible through said user-definable work space;

(b) a unique device identification code;

(c) a biometric login system capable of sensing a preselected biometric indicia of a user for computation of user biometric authentication data; and (d) user-executable code scripted to launch said user-definable work space on said host personal computer when the device is connected to said host personal computer, wherein the user-definable work space provides access to both (i) user files and data stored in said user-accessible data storage and (ii) a private internet site for synching user files and data from said data storage, said access to said data storage and said internet site being provided as a function of both said unique device identification code and said user biometric identification data, and wherein the user-definable work space enables a user to manage access by other office infrastructure devices to said synched user files and data on said private internet site.

* * * * *